Oct. 13, 1959   J. D. DUTCHER ET AL   2,908,611
AMPHOTERICIN B, ITS PRODUCTION, AND ITS SALTS
Filed Dec. 28, 1954   2 Sheets-Sheet 1

FIGURE 1
INFRARED ABSORPTION SPECTRUM OF AMPHOTERICIN A

Inventors
JAMES D. DUTCHER
WILLIAM GOLD
JOSEPH F. PAGANO
JOHN VANDEPUTTE
By Robert Alpher Attorney

2,908,611

AMPHOTERICIN B, ITS PRODUCTION, AND ITS SALTS

James D. Dutcher, New Brunswick, William Gold, Highland Park, Joseph F. Pagano, Bound Brook, and John Vandeputte, Milltown, N.J., assignors to Olin Mathieson Chemical Corporation, New York, N.Y., a corporation of Virginia Application December 28, 1954, Serial No. 478,014

7 Claims. (Cl. 167—65)

This invention relates to new and useful antibiotics, and to methods for their production. More particularly, it relates to new antibiotics in various forms, and to processes for producing them by fermentation, as well as concentrating, purifying and isolating them, and producing their salts. In its free from, one of the two new antibiotics that have been isolated is called amphotericin A; and the other new antibiotic is called amphotericin B; and the unmodified term amphotericin is employed herein to generically designate these two antibiotics and their admixture.

The antibiotics of this invention are formed by the cultivation, under controlled conditions, of a hitherto undiscovered species of Streptomyces.

THE MICROORGANISM

The microorganism useful for the preparation of amphotericin is a newly discovered species of Streptomyces isolated from a sample obtained at Tembladora on the Orinoco River in South America. A culture of the living organism has been deposited, and made a part of the stock culture collection of, the Rutgers Institute of Microbiology (New Brunswick, New Jersey), from whence it is available; and it has been assigned the number 3694 in the Waksman collection, and is hereinafter designated as *Streptomyces nodosus*.

It is to be understood that the invention is not limited to the use of the particular organism described herein, but includes, inter alia, mutants produced from the described organism by mutating agents, such as X-rays, ultraviolet radiation and nitrogen mustards.

For isolating and characterizing the microorganism, a portion of the soil sample is shaken in sterile distilled water and plated on Henrici agar medium. This medium contains:

| | |
|---|---|
| Sodium caseinate or N–Z–Case | gm 5 |
| Glycerol | ml 5 |
| $K_2HPO_4$ | gm 2 |
| $MgSO_4.7H_2O$ | gm 2 |
| $FeSO_4.7H_2O$ | Trace |
| Agar | gm 15 |
| Distilled water | liter 1 |

The medium is adjusted to pH 7.0, and sterilized in an autoclave at 121° C. for 20 minutes. After 7 to 10 days' incubation at 25° C., colonies of *Streptomyces nodosus* are isolated from the plated soil. These isolated colonies are then grown on an agar medium which contains:

| | Gm. |
|---|---|
| Bacto tryptone | 5 |
| Malt extract | 3 |
| Glucose | 10 |
| Yeast extract | 3 |

Distilled water to 1 liter.

The agar is autoclaved at 121° C. for fifteen minutes.

The microorganism, when tested by the streak plate procedure on yeast beef agar for antibiotic activity against both bacteria and fungi, does not inhibit any of the test bacteria, but does inhibit the test fungi *Saccharomyces cerevisiae*, *Rhodotorula glutinis*, *Candida albicans*, and *Aspergillus niger*.

The following is a description of colonies of the microorganism incubated for various times and on various media:

*Potato plug.*—After 15 days, growth is spreading, very heavy, moist, tough, about the same color as the potato, white spores covering part of the growth on the slant portion.

*Litmus milk.*—In 7 days, the ring of growth at the surface is colorless. The milk turns blue-purple, clearing gradually from the top toward the bottom, indicating proteolysis without coagulation.

*Czapek-Dox agar.*—$NaNO_3$, 3 gm.; $KH_2PO_4$, 1 gm.; KCl, 0.5 gm.; $MgSO_4.7H_2O$, 0.5 gm.; $FeSO_4.7H_2O$, 0.01 gm.; glucose, 40 gm.; agar, 15 gm.; distilled water to 1,000 ml.

No growth in 15 days, in spite of two inoculations.

*Glucose-nutrient-brom cresol purple agar slant.*—Beef extract, 3 gm.; proteose peptone, 10 gm.; glucose, 10 gm.; NaCl, 5 gm.; agar, 20 gm.; brom cresol purple, 0.15 gm.; distilled water to 1,000 ml. pH 7.0.

Moderately heavy growth in 51 days, wrinkled, shiny, asporogenous. The wrinkling on all agars is very characteristic. The wrinkles are parallel, straight-line indentations in the culture at right angles to one another, giving a "stone wall" appearance with rectangles of various sizes.

*Sabouraud agar slant.*—Glucose, 40 gm.; neopeptone, 10 gm.; agar, 15 gm.; distilled water, 1,000 ml.

At four days, the culture is yellow, turning brownish at seven days, all brown at fifteen days. Growth is heavy, first shiny, then turning dull, wrinkled with a brown diffusible pigment visible by three to four days.

*Glucose-asparagine agar slant.*—Glucose, 10 gm.; $K_2HPO_4$, 0.5 gm.; asparagine, 0.5 gm.; agar, 15 gm.; distilled water, 1,000 ml.

At seven and fifteen days, growth is moderately heavy, unwrinkled, colorless, with white spores turning gray, and a yellow diffusible pigment turning brownish. In addition, a water-insoluble, deep yellow material is deposited in the edges of the agar slant at the base of the slant. This material is soluble in methanol, propanol, and dimethyl formamide.

The microorganism is further characterized by the fact that hydrogen sulfide is not produced as evidenced by the lead acetate paper test in a medium containing: Proteose peptone, 20 gm.; glucose, 1 gm.; $Na_2HPO_4$, 2 gm.; agar, 2 gm.; and distilled water to 1 liter. The culture grows as a white, asporogenous pellicle. Furthermore, Difco gelatin is liquified. The culture grows as a light brown, asporogenous ring at the surface. Still further, in Difco nitrate broth, the culture grows as a light brown asporogenous pellicle. The broth darkens with a diffusing brown pigment. Nitrate is strongly reduced to nitrite. Additionally, starch is hydrolyzed by the culture when grown in a medium containing starch.

To determine the carbon and nitrogen nutrition of *Streptomyces nodosus*, tests were made as follows: Four series of tubes of mineral salts agar are prepared with 1 mg. per ml. of these four nitrogen sources respectively: $(NH_4)_2SO_4$, $NaNO_3$, asparagine, and casein hydrolysate. In each series, each tube is fortified with 10 mg. per ml. of one of sixteen possible carbon and energy sources. These are starch, inulin, dextrin, raffinose, maltose, lactose, sucrose, sorbose, glucose, dulcitol, inositol, sorbitol, mannitol, xylose, arabinose, and glycerol.

The agar in the tubes (10 ml.) is slanted, and the slants are streaked with a suspension of *Streptomyces nodosus* spores in distilled water. After 9 days incubation, the growth was examined and is described in Table I following.

TABLE I.—GROWTH OF *STREPTOMYCES NODOSUS* FOR NINE DAYS ON VARIOUS CARBON AND NITROGEN SOURCES

[Nitrogen source, 1 mg./ml.]

| Carbon and Energy Source, 10 mg./ml. | $(NH_4)_2SO_4$ | $NaNO_3$ | Asparagine | Casein Hydrolysate |
|---|---|---|---|---|
| none | 0 | 0 | sparse, white spores | sparse, gray spores. |
| starch | scanty, asporogenous | 0 | heavy, brown mycelium, brown diffusible pigment, asporogenous. | heavy, brown mycelium, brown diffusible pigment, asporogenous. |
| inulin | 0 | 0 | sparse, white spores | sparse, white spores. |
| dextrin | scanty, asporogenous | 0 | heavy, brown mycelium, brown diffusible pigment, asporogenous, yellow deposit in agar. | heavy, brown mycelium, brown diffusible pigment, asporogenous yellow deposit in agar. |
| raffinose | 0 | 0 | sparse, white spores | sparse gray spores. |
| maltose | scanty, asporogenous | 0 | heavy, brown mycelium, some white spores, brown diffusible pigment, yellow deposit in agar. | heavy, brown growth, asporogenous, brown diffusible pigment, yellow deposit. |
| lactose | do | 0 | heavy, brown mycelium, asporogenous brown diffusible pigment. | moderate, black mycelium, gray spores near butt. |
| sucrose | barely germinated | 0 | moderate, white spores | moderate, gray spores. |
| sorbose | 0 | 0 | scanty, asporogenous | scanty, gray spores. |
| glucose | scanty, asporogenous | 0 | heavy, brown mycelium, some white spores, brown diffusible pigment, yellow deposit. | heavy, brown mycelium, asporogenous, brown diffusible pigment, yellow deposit. |
| dulcitol | barely germinated | 0 | scanty, white spores | scanty, gray spores. |
| inositol | scanty, asporogenous | 0 | moderate, white spores | moderate, spores gray, sporulation heavy. |
| sorbitol | barely germinated | 0 | 0 | scanty, inhibited. |
| mannitol | moderate asporogenous | 0 | heavy, brown mycelium, some white spores, brown diffusible pigment. | heavy, brown mycelium, asporogenous, brown diffusible pigment. |
| xylose | barely germinated | 0 | moderate, white spores | scanty, inhibited. |
| arabinose | do | 0 | do | 0. |
| glycerol | do | 0 | moderate, brown mycelium, some white spores, brown diffusible pigment. | heavy, brown mycelium, asporogenous brown diffusible pigment. |

NOTE.—0 indicates no growth.

The results indicate that the microorganism is capable of assimilating carbon from starch, dextrin, maltose, glucose, and mannitol, regardless of the source of nitrogen. With the organic nitrogen sources, lactose, sucrose, inositol and glycerol may also be used, although growth with these carbon sources may be lighter than with glucose and its polymers. Nitrates will not serve as nitrogen sources with any of the carbon and energy sources, whereas asparagine and casein hydrolysate can serve as sole sources of carbon, nitrogen, and energy.

THE ANTIBIOTICS

*Streptomyces nodosus* produces a mixture of antibiotics. The mixture itself, as well as the specific antibiotics isolated from said mixture, possesses a wide antifungal spectrum, but no significant antibacterial properties.

In order to form amphotericin, *Streptomcyes nodosus* is grown at a suitable temperature of from 23° C. to 30° C., preferably about 25° C., under submerged aerobic conditions in an aqueous nutrient medium containing an assimilable, fermentable carbohydrate source and an assimilable nitrogen source. Suitable carbohydrate sources, as indicated above, include: starch; dextrin; sugars, such as maltose, lactose, and glucose; glycerol; etc. Suitable nitrogen sources include asparagine, casein hydrolysate, soybean meal, beef extract, yeast extract, etc. The fermentation is carried out for about 24 to 150 hours. At the end of this period of time, a substantial amount of amphotericin has been formed (as shown by bioassays), as more fully disclosed in the examples.

After growth has been completed, amphotericin is separated from the culture by any one of the three following alternative methods: (1) The mycelium is separated from the whole broth by filtration or centrifugation, and amphotericin is extracted from the mycelium, after lowering the pH of the mycelium to about 2 to 3 by treatment with an acid. The extraction is done with a suitable solvent such as a lower alkanol (e.g. isopropanol, n-propanol or n-butanol). Evaporation of the alkanol causes precipitation of the crude amphotericin. (2) The whole broth is alkalinized to a pH about 11, and preferably to a pH of about 12, by means of a base broth is then agitated and filtered, and the filtrate is neutralized to a pH of about 7 by means of an acid, such as a mineral acid (e.g. hydrochloric acid, sulfuric acid or phosphoric acid) to precipitate the crude amphotericin. (3) The pH of the whole broth is adjusted either to a value of about 2 to 3 (by treatment with an acid) or a such as sodium hydroxide or potassium hydroxide. The value of 10 to 11 (by treatment with a base), since amphotericin is more soluble at these pH ranges. The broth is then extracted with a suitable extracting agent, such as the alkanols previously listed; filtered; and the phases are separated (if n-butanol is used). The crude amphotericin is then directly precipitated from the filtrate by neutralizing to a pH of about 7 and removing a portion of the extracting agent by vacuum distillation.

Further purification of the crude amphotericin isolated by any one of these processes results in fractionation into its two components, amphotericin A and amphotericin B. This fractionation is carried out by either one of the following processes:

(1) The precipitate of crude amphotericin is slurried in an alcohol, such as a lower alkanol (e.g. methanol, n-propanol, isopropanol, and butanol) at a low pH (obtained by treating the slurry with an acid such as a mineral acid) and filtered. The insoluble material consists mainly of crude amphotericin B. The filtrate is neutralized with a base, such as sodium hydroxide, to cause formation of a precipitate of purified crystalline material, representing primarily amphotericin A.

(2) The precipitate of crude amphotericin is slurried in a solvent, such as a di(lower alkyl) lower alkanoic acid amide (e.g. dimethyl formamide, dimethyl acetamide or diethyl formamide) and filtered. The insoluble material consists mainly of crude amphotericin B. By treating the amide solution with a mixture of water and an organic polar solvent, such as aqueous alcohol (e.g. a methanol-water solution) or an aqueous ketone (e.g. an acetone-water solution), a crystalline precipitate comprising mainly amphotericin A is obtained.

Amphotericins A and B are amphoteric substances which easily form salts with both bases and acids. Thus by treating amphotericin with an inorganic base, such as an alkali metal base (e.g. sodium hydroxide or potassium hydroxide) or an alkaline earth metal base, the corresponding metal salt is formed. By treating amphotericin with an alkaline earth metal salt (e.g. calcium chloride or magnesium chloride) in an alcohol such as methanol, complexes are formed. By reacting amphotericin with ammonium hydroxide or an organic nitrogen base, the corresponding ammonium or amine salt is formed.

Each of the amphotericins further reacts with both mineral and organic acids to form the corresponding acid salt. Thus amphotericin can be reacted with mineral acids, such as hydrochloric acid, sulfuric acid, or phosphoric acid, to form the corresponding hydrochloride, sulfate or phosphate salt; or it may be reacted with organic acids such as acetic, citric, or tartaric acid, to form the corresponding acid salts.

The following examples illustrate suitable methods for preparing, purifying and fractionating amphotericin.

*Example 1.—Tank fermentation of Streptomyces nodosus*

An 800-gallon batch of *Streptomyces nodosus* is fermented with the inoculum medium, time, and conditions tabulated below.

Inoculum preparation:
  A. First stage—
    Inoculum source: culture *Streptomyces nodosus*, grown on Gould agar slants.
    Medium:
      3% Staley's Nutrient 4S
      2% glucose
      .0005% $CoCl_2.6H_2O$
      .1% $CaCO_3$
      pH adjusted to 7.0–7.2
    Sterilization: 30 minutes at 121° C.
    Volume: 100 ml. in 500 ml. flask
    Temperature: 25° C.
    Incubation: 72 hours on a reciprocating shaker (170 cycles per minute)
  B. Second stage—
    Inoculum source: 10% from first stage
    Medium: same as first stage
    Sterilization: 40 minutes at 121° C.
    Volume: 480 ml. in 2000 ml. flask
    Temperature: 25° C.
    Incubation: 48 hours on a reciprocating shaker (120 cycles per minute)

Fermentation conditions:
  Medium:
    3% Staley's Nutrient 4S
    2% glucose
    .25% $CaCO_3$
    .1% NaCl
    .0005% $CoCl_2$
  Sterilization: 15 minutes at 121° C. full dilution
  Temperature: 25° C.
  Agitation: .2 H.P./100 gal.
  Aeration: 2.0 ft./min. superficial air velocity
  Fermentation cycle: 144 hours
  Defoamer: Prime burning oil (about 0.5% of batch)
  Inoculum size: 480 ml. from second flask stage (4%)
  Volume: 12,000 ml.

The results of the fermentation are given in the following table (with respect to two batches):

| Batch | 1 | | | 2 | | |
|---|---|---|---|---|---|---|
| Fermentation Age, hours | Assay vs. *S. Cerevisae* dilution units | | pH | Assay vs. *S. Cerevisae* dilution units | | pH |
| | Extracted [1] | Broth [1] | | Extracted [1] | Broth [1] | |
| 0 | | | 6.5 | | | 6.6 |
| 25 | 1,600 | 120 | 7.2 | 640 | 120 | 7.2 |
| 49 | 1,600 | 120 | 7.0 | 120 | 120 | 7.1 |
| 73 | 8,000 | 180 | 7.1 | 12,000 | 80 | 7.3 |
| 97 | 4,000 | 80 | 7.0 | 3,000 | 120 | 7.1 |
| 121 | 3,000 | 40 | 6.9 | 4,000 | 120 | 7.9 |
| 144 | 9,706 | 2,560 | 7.2 | 40 | 80 | 8.1 |

[1] Samples were centrifuged (the assays on the supernatant being reported as Broth), and the centrifugate extracted with a volume of butanol equal to the original sample (the assays on this extract being reported as Extracted).

*Example 2.—Shake flask fermentation of Streptomyces nodosus*

An appropriate inoculum, prepared in the manner described in Example 1, is introduced into a fermentation medium containing:

| | |
|---|---|
| Soybean meal | 10 gm. |
| Ground whole potato | 10 gm. |
| Dextrose | 10 gm. |
| $CoCl_2.6H_2O$ | 10 ml. of 0.05% solution |
| $CaCO_3$ | 1 gm. |
| Distilled water | 1 liter. |

The medium is sterilized by autoclaving at 121° C. for 20 minutes prior to the introduction of the inoculum. At the end of four days, assays were run against *Saccharomyces cerevisiae* with a portion of the broth which has been lyophilized and reconstituted with water to about 2⅓ times the original concentration, (on both the clear supernatant broth and on the butyl alcohol extract of the washed cells, restored to the original sample volume) giving the following results:

| | S. cerevisia assay, dilution units/ml. |
|---|---|
| Broth supernatant-fluid | 5000 |
| Cell extracts | 5000 |

As a result of these assays, the fermentation is carried out for five days, at the end of which time a test of the broth for activity shows it to be active against *Candida albicans* in a disc test.

Amphotericin may be extracted from the whole broth in the manner illustrated by the following examples:

*Example 3.—Isopropanol extraction from whole broth*

Extraction of amphotericin produced in Example 1 from the whole broth is carried out by adding 80 to 170% of the broth volume of isopropanol and adjusting to a pH of 2.0 with sulfuric acid. After agitation for about ½ hour, the mixture is filtered, preferably with the use of a filter-aid. The pH of the filtrate is readjusted to about 7 with sodium hydroxide, and the isopropanol distilled off under vacuum at a temperature not greater than 35° C. The mixture is then placed in a cold room overnight, the precipitate which forms it filtered off, washed with acetone, and dried in vacuum. A mixture of amphotericin A and amphotericin B is obtained in a yield of about 40%. The mixture assays about 1500–2500 d.u./mg. (*Saccharomyces cerevisiae*).

*Example 4.—Butanol extraction from whole broth*

To 9.4 liters of whole broth, assaying 3,000 d.u./ml., is added one-fourth of its volume of butanol. The pH is lowered to 2.0 with sulfuric acid, and the mixture is agitated well from one-half hour. Hyflo (5% w./v.), or other filter aid, is then added, and the mixture filtered. The filtrate is placed in a separatory funnel and the butanol layer separated and retained. The butanol solution is then distilled down to ⅓ its original volume under vacuum at a temperature no greater than 35° C. A precipitate forms, which is filtered off, washed well with acetone, and vacuum dried. The product, which is obtained in about 22% yield, is a mixture of amphotericin A and amphotericin B, and assays about 1600 d.u./mg. against *Saccharomyces cerevisiae* and about 960 d.u./mg. against *Candida albicans*.

*Example 5.—Extraction of amphotericin from mycelium*

One liter of amphotericin-containing whole broth is centrifuged to separate filtrate and cycelium. The moist mycelium cake is stirred with 200 ml. of n-propanol, adjusted to a pH of 2.0 to 3.0 with sulfuric acid, and left in a cold room over night. The propanol is separated by centrifuging, and the mycelial cake is extracted three more times with 100 ml. portions of n-propanol. The combined propanol extracts are concentrated in vacuo to a small volume of about 130 ml., at which point a precipitate forms. This precipitate is centrifuged down and dried in a vacuum. About 1.114 gm. are recovered, with a potency of about 1176 *Candida albicarns* d.u./mg. 820 mg. of this solid is finely ground and dissolved by warming in a mixture of 80 ml. of n-butanol and 16 ml. of methanol while 80 ml. of water is gradually added. To this solution 48 ml. of hexane is added, and the mixture stirred and allowed to stand at room temperature overnight. A crop of pale yellow crystals of amphotericin is formed, which is filtered and dried in a desiccator. Further crops of less pure material may be obtained by concentrating the mother liquors in vacuo.

*Example 6.—Extraction from basic whole broth*

To a 500 ml. sample of amphotericin-containing whole broth assaying 11,000 d.u./ml. *Saccharomyces cerevisiae* is added an equal volume of isopropyl alcohol. The pH of this mixture is then raised to 10.5 using 20% sodium hydroxide. This mixture is then stirred for one-half hour, 2% Hyflo (w./v.) is then added, and it is filtered. The pH of the filtrate is lowered to 7, using 20% sulfuric acid, and the isopropyl alcohol removed under vacuum at a temperature no greater than 35° C. After standing overnight, the precipitate is filtered off, washed with water, then with acetone, and dried in vacuum. The yield amounts to about 1.22 g. (77%) of a mixture of amphotericin A and amphotericin B, which assays about 3400 d.u./mg. (*Saccharomyces cerevisiae*).

The amphotericin mixtures may be fractionated into their components, amphotericin A and amphotericin B, by the processes illustrated in the following examples:

*Example 7.—Crystallization using alcohol*

The amphotericin obtained in Example 6 is placed in a 70% isopropyl alcohol 30% water slurry at a concentration of 32,000–35,000 u./ml. *Candida albicans*, with stirring; and the pH is lowered to 2 with hydrochloric acid. The insoluble material (crude amphotericin B) is filtered off and the pH of the filtrate raised to about 7.5. After standing overnight, the crystalline precipitate, consisting primarily of purified amphotericin A, is filtered off, washed with acetone and dried under vacuum. The yield of amphotericin A is about 50%, on a bioactivity basis.

*Example 8.—Crystallization using dimethyl formamide*

The amphotericin obtained in Example 6 is slurried in dimethyl formamide (1 g./20 ml.). With stirring, the pH is lowered to 7, using concentrated hydrochloric acid. After stirring for one-half hour, Hyflo (1% w./v.) is added, and the mixture filtered. To the filtrate is added one volume of methanol followed by the slow addition of one volume of water. (Although a methanol-water solution is preferred, ethanol, acetone, or dioxane in water are also effective.) The mixture is then allowed to stand overnight at the resulting pH of 4.5. The precipitate thus formed is filtered off, washed with acetone and dried. It is composed of 85–90% amphotericin B, 5–10% amphotericin A, and a minor amount of other impurities.

The pH of the resulting mother liquor from which amphotericin B has been isolated is then raised to 8 by addition of sodium hydroxide, and an additional 3 volumes of water is added. After standing overnight, the precipitate is filtered off, washed with acetone and dried. This precipitate is composed of 80–85% amphotericin A, 5–10% amphotericin B, and a minor amount of other impurities.

The overall activity recovery amounts to 90–95%.

The fraction containing predominantly amphotericin B can be further purified by slurrying it in 70% aqueous isopropanol, at a concentration of 1 g. per 100 ml. at pH 2 for one-half hour. The mixture is then filtered, the filtrate warmed to 45° C., and the pH slowly raised to 5 with sodium hydroxide. This mixture is then allowed to cool slowly to room temperature and stand overnight. The crystalline product (about 50% yield) is then filtered off, washed with acetone and dried. It represents substantially pure amphotericin B.

The fraction containing predominantly amphotericin A can be further purified by slurrying it in dimethylformamide at a concentration of 1 g. per 20 ml., stirring for one hour, filtering off the insolubles and adding the filtrate slowly to an equal volume of 50% aqueous methanol. The crystalline precipitate is filtered off after standing overnight, washed with acetone and dried. Substantially pure amphotericin A is obtained thereby in approximately 70–80% yield.

Fractionation and crystallization of the products obtained in Examples 1 through 5 also may be carried out by the methods of either Example 7 or 8, the latter being preferred, however, due to the higher yields of pure fraction obtained.

Salts and complexes of amphotericin may be prepared according to the methods of the following examples:

*Example 9.—Preparation of alkali metal salts of amphotericin*

Amphotericin, either the crude mixture or in the form of purified crystals of either amphotericin A or B, readily form salts, and the following process is equally effective in forming either the sodium or potassium salt of the mixture or the purified A or B components: Crystalline amphotericin A is suspended in an amount of methanol such that the concentration of the antibiotic is about 250,000 u./ml. (*Saccharomyces grevisiae*). Two equivalents of 1 N methanolic sodium hydroxide are added, and the mixture is stirred for 15 minutes to assure complete solution of the antibiotic. The solution is filtered and 10 volumes of acetone are added to the filtrate. A precipitate of the sodium salt is formed thereby, which is filtered off, washed with acetone, and dried in a desiccator. The yield of the sodium salt is about 90% of the original amphotericin based on its biological activity (in vitro).

The sodium salt has a much greater solubility in water (50–60 mg./ml.) than the original crystalline amphotericin A. It also has good solubility in methanol and diemthyl formamide. It is somewhat soluble in ethanol and isopropanol, but insoluble in ether, acetone, butanol, chloroform, benzene, hexane, and dioxane.

*Example 10.—Preparation of the calcium chloride complex*

A calcium chloride complex of amphotericin can be prepared by dissolving either crystalline amphotericin A or B (or a mixture thereof) in 1% methanolic calcium chloride (1 gm./20 ml.), filtering off any insoluble material and adding 5 volumes of acetone to the filtrate. The precipitate is filtered off, washed with acetone and dried under vacuum. The solubility of the calcium chloride complex in organic solvents is similar to that of the acid salts. In water, however, the complex hydrolyzes and its solubility is that of the original amphotericin.

*Example 11.—Preparation of an acid salt*

Crystalline amphotericin A or B (or a mixture thereof) is dissolved in dimethyl formamide (1 g./25 ml.), and an equivalent of concentrated hydrochloric acid is added thereto. The mixture is filtered and ten volumes of acetone are added to the neutral filtrate. The precipitate formed thereby is filtered off, washed with acetone, and dried in a vacuum desiccator. The product, which is obtained in about a 90% yield, contains one equivalent of acid and has an invitro bioactivity equivalent to that of the crystalline amphotericin. It is somewhat more soluble in water and much more soluble in methanol, ethanol, isopropanol and butanol than is the crystalline amphotericin. The acid salt, however, is insoluble in acetone, chloroform, ether, benzene, ethyl acetate and hexane.

The sulfate has been prepared in the same manner by substituting an equivalent of sulfuric acid for the hydrochloric acid. It has properties similar to the hydrochloride.

CHEMICAL AND PHYSICAL PROPERTIES OF AMPHOTERICIN

*Crystalline amphotericin A* has the following physical and chemical characteristics:

Melting point: Darkens at 180–185° C., browns and shrinks at 198–200° C. melts with decomposition at about 210° C.

Elementary analysis:

C=59.28%
H=8.43%
N=1.81%
O=30.48% (by difference)
No other elements present
No methoxy or acetyl groups Specific optical rotation: $[\alpha]_D^{24°C.}$ + 163° (pyridine); +93° (acetic acid); 136° (dimethyl formamide); +28° (0.1 N HCl in methanol).

Solubility: Good solubility in glacial acetic acid and dimethyl formamide. Soluble to the extent of about 1 mg./ml. in methanol, aqueous isopropyl alcohol and wet butanol, much more soluble in these solvents when acidified or highly alkalinized. (For example, in a 50% isopropyl alcohol solution, the solubility of amphotericin A is, as stated, approximately 1 mg./ml. at pH's between 3 and 8; at pH's of 2, 9, and 10, however, the solubility is 3 mg./ml. whereas at pH 11, the solubility has increased to 8–10 mg./ml.).

The antibiotic is insoluble in water at neutral or acid pH's under ordinary conditions, but is soluble at pH 10 and above. In dilute solutions, however, the antibiotic may be dissolved in a neutral aqueous solution by raising the pH of a suspension of the material to 11 as, for example, with sodium hydroxide. The solution thus formed may then be neutralized with an acid without any precipitation occurring.

Amphotericin A is insoluble in ether, dioxane, ethyl acetate, amyl acetate, chloroform, benzene, acetone, hexane, absolute ethanol, isopropanol or butanol.

Ultraviolet spectrum: The ultraviolet absorption maxima of crystalline amphotericin A in methanol are:

| λ max. (mμ) | $E_{1cm.}^{1\%}$ |
|---|---|
| 228 | 280 |
| 280 | 262 |
| 291 | 520 |
| 304 | 780 |
| 318 | 715 |
| 343 | 24 |
| 362 | 34 |
| 381 | 55 |
| 405 | 66 |

Some of the adsorption in the 362–405 region may be due to the presence of some amphotericin B.

Figure 1:
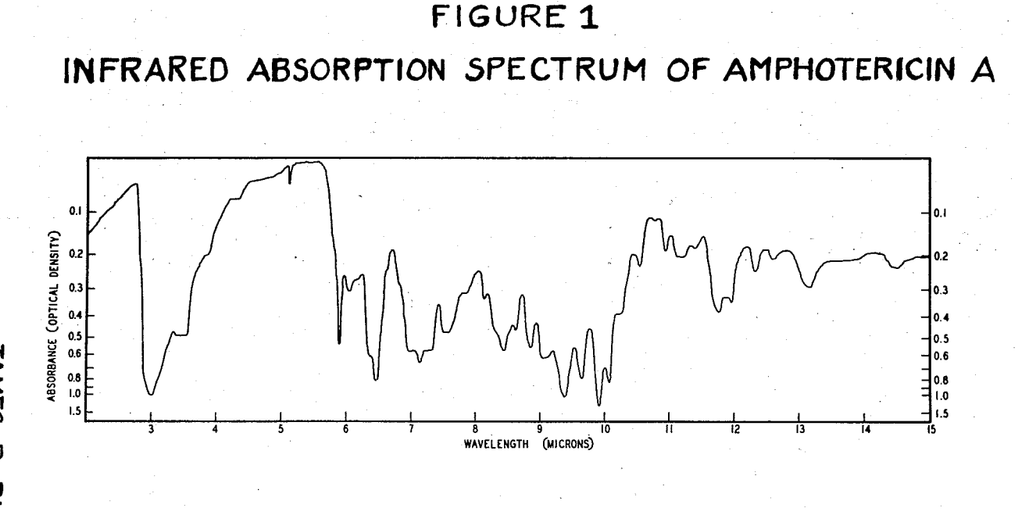

Infrared spectrum: The infrared absorption spectrum of amphotericin A suspended in Nujol mull is reproduced in Figure 1. Amphotericin A shows peaks (and shoulders indicated as "sh") at the following frequencies and wave lengths:

| Frequency (cm.⁻¹) | Wavelength (μ) | Frequency (cm.⁻¹) | Wavelength (μ) |
|---|---|---|---|
| 3,333 | 3.00 | 1,129 | 8.86 |
| 1,695 | 5.90 | 1,105 | 9.05 |
| 1,656 | 6.04 | 1,066 | 9.38 |
| 1,623 | 6.16 sh | 1,035 | 9.66 |
| 1,567 | 6.38 sh | 1,008 | 9.92 |
| 1,546 | 6.47 | 992 | 10.08 |
| 1,425 | 7.02 sh | 977 | 10.24 sh |
| 1,403 | 7.13 | 949 | 10.54 |
| 1,374 | 7.28 sh | 912 | 10.96 |
| 1,323 | 7.56 | 893 | 11.20 |
| 1,276 | 7.84 sh | 877 | 11.40 |
| 1,232 | 8.12 | 850 | 11.76 |
| 1,201 | 8.32 sh | 836 | 11.96 |
| 1,183 | 8.45 | 810 | 12.34 |
| 1,159 | 8.63 | 794 | 12.60 |
|  |  | 760 | 13.16 |

Neutral equivalent of crystalline amphotericin A:
929 titrated as a base
989 titrated as an acid pH stability: Stable as all pH's between 3 and 11 for at least as long as 24 hours. At a pH as low as 2, amphotericin A is stable for as long as 3 hours with only a small amount of decomposition taking place.

Thermal stability: Stable up to about 70° C. in a neutral solution of 50% isopropanol.

Chemical tests: Yields a yellow color with ferric chloride.

*Crystalline amphotericin B* has the following physical and chemical characteristics:

Melting point: No distinct melting point; darkens and chars.

Elementary analysis:
C=56.70%
H=7.72%
N=1.87%
O=33.71%
No other element present
No methoxy or acetyl groups Specific optical rotation: $[\alpha]_D^{24°C.}$ +238° (dimethyl formamide); −52.2° (0.1 N HCl in methanol).

Solubility: Good solubility in dimethyl formamide and glacial acetic acid. Soluble to the extent of 0.5 mg./ml. in methanol, aqueous isopropyl alcohol and wet butanol, and much more soluble in these solvents when acidified or highly alkalinized.

Ultraviolet spectrum: The ultraviolet absorption maxima of crystalline amphotericin B in methanol are:

| λ Max. (mμ) | $E_{1cm.}^{1\%}$ |
|---|---|
| 225 | 230 |
| 263 sh | 42.8 |
| 273 | 60.0 |
| 283 | 76.0 |
| 345 | 390 |
| 362 | 830 |
| 382 | 1,380 |
| 405 | 1,540 |

Figure 2:
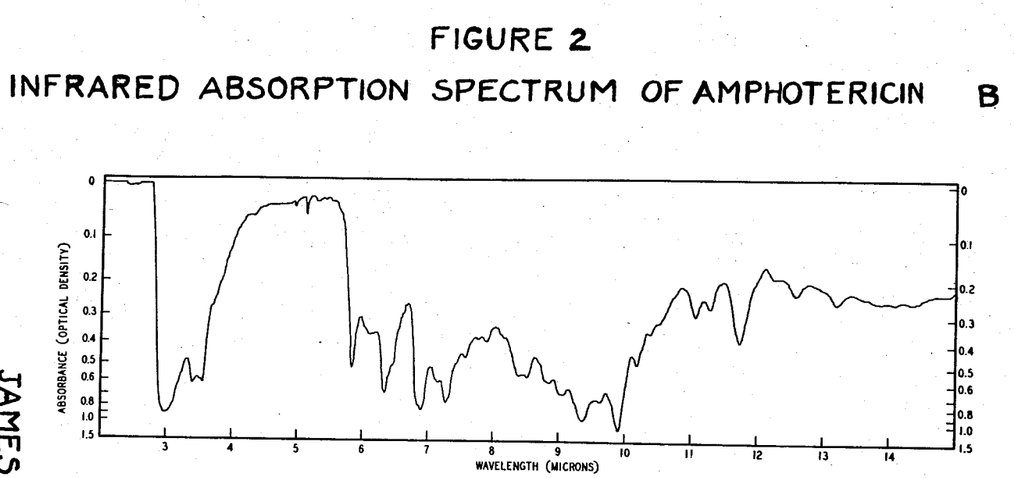

Infrared spectrum: The infrared absorption spectrum of amphotericin B suspended in Nujol mull is reproduced in Figure 2. Amphotericin B shows peaks (and shoulders indicated as "sh") at the following frequencies and wavelengths:

| Frequency (cm.⁻¹) | Wavelength (μ) | Frequency (cm.⁻¹) | Wavelength (μ) |
|---|---|---|---|
| 3,333 | 3.00 | 1,042 | 9.60 |
| 1,709 | 5.85 | 1,008 | 9.92 |
| 1,577 | 6.34 | 981 | 10.19 |
| 1,401 | 7.14 | 965 | 10.36 sh |
| 1,374 | 7.28 | 903 | 11.08 |
| 1,323 | 7.56 sh | 886 | 11.29 |
| 1,266 | 7.90 | 852 | 11.74 |
| 1,232 | 8.12 | 812 | 12.32 sh |
| 1,192 | 8.39 | 794 | 12.60 |
| 1,174 | 8.52 | 758 | 13.20 |
| 1,134 | 8.82 |  |  |
| 1,106 | 9.04 |  |  |
| 1,068 | 9.36 |  |  |

Neutral equivalent of crystalline amphotericin B: 760 titrated as a base.

The pH stability and thermal stability of amphotericin B is similar to the corresponding stabilities of amphotericin A.

BIOLOGICAL PROPERTIES OF THE AMPHOTERICINS

The amphotericin, as the mixture and as purified amphotericin A and amphotericin B, possess a wide antifungal spectrum, as shown by the following tabulation:

|  | Mixed Amphotericins, MIC in γ/ml. | Amphotericin A, MIC in γ/ml. | Amphotericin B, MIC in γ/ml. |
|---|---|---|---|
| Saccharomyces cerevisiae | 3.1 | 3.1 | 25 |
| Aspergillus fumigatus | 3.1 | 3.1 | >100 |
| Aspergillus niger | 3.1 | 3.1 | >100 |
| Penicillium notatum | 3.1 | 3.1 | >100 |
| Ceratostomella ulmi | 1.6 | 1.6 | 3.1 |
| Candida albicans | 1.6 | 1.6 | 6.3 |
| Trichophyton mentagrophytes 9533 | 1.6 | 1.6 | 12.5 |
| Microsporum audouini | 12.5 | 3.1 | >100 |
| Microsporum canis | 3.1 | 3.1 | >100 |
| Botrytis tulipae | 6.3 | 6.3 | >100 |
| Rhodotorula glutinis | 3.1 | 3.1 | >100 |
| Fusarium bulbigenium | 6.3 | 6.3 | >100 |

The above tabulation does not represent a true indication of the activity of amphotericin B, since this antibiotic is extremely insoluble, and hence its effectiveness in the agar medium used in determining the above antifungal spectrum is greatly diminished. Thus, in the tube assays in broth, when amphotericin B is compared with the mixed amphotericins for effectiveness against Candida albicans and Saccharomyces cerevisiae, it has been determined the amphotericin B is, respectively, 8.10 and 6.17 times more effective than is the mixed amphotericins.

Further tests have been conducted in eggs and mice to determine the effectiveness of amphotericin as the mixture and as pure amphotericin A and pure amphotericin B, against Candida albicans. The conditions and results of representative tests with eggs (Table II) and mice (Table III) are as follows:

In both tests, the antibiotics used were: (1) a mixture of amphotericin A and amphotericin B dissolved in dimethyl acetamide and then diluted with water so that the final ratio of antibiotics to solvent was 1 to 10 (hereinafter referred to as "Base"); (2) a mixture of sodium salts of amphotericin A and amphotericin B dissolved in dimethyl acetamide and then diluted with water so that the final ratio of antibiotic to solvent was 1 to 10 (hereinafter referred to as "Na salt"), and (3) a mixture of the hydrochloride salts of amphotericin A and amphotericin B dissolved in dimethyl acetamide and then diluted with water so that the final ration of antibiotic to solvent was 1 to 10 (hereinafter referred to as "HCl salt").

TABLE II

[Seven-day-old eggs were infected with 100 LD$_{50}$'s standardized inoculum via the yolk sac. One hour after infection, the eggs were treated via the yolk sac with the designated antibiotic at the level indicated below.]

| Antibiotic | Level Tested (mg./egg) | Average Survival Time (hours) | Difference in Survival Time (hours) | Survived/Total (after 10 days) | PD$_{50}$ (mg./egg) |
|---|---|---|---|---|---|
| Control—Dimethyl Acetamide | | 96 | | 0/12 | |
| Base | 0.4 | 219 | +123 | 7/11 | 0.29 |
|  | 0.2 | 201 | +105 | 3/11 | |
|  | 0.1 | 166 | +70 | 0/12 | |
|  | 0.05 | 149 | +53 | 0/12 | |
| Na salt | 0.4 | 227 | +131 | 6/11 | 0.36 |
|  | 0.2 | 193 | +97 | 0/11 | |
|  | 0.1 | 173 | +77 | 1/12 | |
|  | 0.05 | 116 | +20 | 0/12 | |
| HCl salt | 0.4 | 178 | +82 | 3/10 | Sl. >0.4 |
|  | 0.2 | 186 | +90 | 1/9 | |
|  | 0.1 | 185 | +89 | 1/11 | |
|  | 0.05 | 173 | +77 | 1/10 | |

TABLE III

[Male mice weighing 21–25 grams were infected intravenously with 0.5 ml. saline suspension containing 4×10$^6$ cells (2×10$^6$ cells/mouse). Immediately after infection, the mice were treated per os (p.o.) or subcutaneously (s.c.) twice daily for two days with the indicated antibiotic at the level indicated below.]

| Antibiotic | Daily Treatment (mg./mouse ×2 days) | Route | Average Survival Time (hours) | Difference in survival Time (hours) | Survived/Total (after 10 days) | PD$_{50}$ [2] mg./mouse | PD$_{50}$ [2] mg./kg. |
|---|---|---|---|---|---|---|---|
| Control, 0.5 ml. saline | | s.c. | 31 | | 0/10 | | |
| Base | [1] 0.063 | s.c. | >240 | >209 | 10/10 | 0.028 | 1.2 |
|  | 0.032 | s.c. | >167 | >136 | 6/10 | | |
|  | 0.016 | s.c. | >111 | >80 | 2/10 | | |
| Na salt | 0.063 | s.c. | >240 | >209 | 10/10 | 0.019 | 0.8 |
|  | 0.032 | s.c. | >223 | >192 | 9/10 | | |
|  | 0.016 | s.c. | >171 | >140 | 4/10 | | |
| HCl salt | 0.063 | s.c. | >218 | >188 | 9/10 | 0.024 | 1.0 |
|  | 0.032 | s.c. | >199 | >168 | 8/10 | | |
|  | 0.016 | s.c. | >84 | >53 | 2/10 | | |
| Control 0.5 ml. saline | | p.o. | 30 | | 0/10 | | |
| Base | 0.125 | p.o. | >231 | >201 | 9/10 | 0.044 | 1.9 |
|  | 0.063 | p.o. | >197 | >167 | 7/10 | | |
|  | 0.032 | p.o. | >82 | >52 | 1/10 | | |
|  | 0.016 | p.o. | 44 | +14 | 0/10 | | |
| Na salt | 0.125 | p.o. | >240 | >210 | 10/10 | 0.063 | 2.7 |
|  | 0.063 | p.o. | >182 | >152 | 5/10 | | |
|  | 0.032 | p.o. | 81 | +51 | 0/10 | | |
|  | 0.016 | p.o. | 46 | +16 | 0/10 | | |
| HCl salt | 0.125 | p.o. | >240 | >210 | 10/10 | 0.041 | 1.7 |
|  | 0.063 | p.o. | >240 | >210 | 10/10 | | |
|  | 0.032 | p.o. | >114 | >84 | 1/10 | | |
|  | 0.016 | p.o. | >70 | >40 | 1/10 | | |

[1] Figure represents total daily doses, i.e.: 0.063=0.0315 mg./mouse, b.i.d. mg./kg. calculated on a 23 g. average mouse.    [2] Reed & Muench's method;

The toxicity of amphotericin is tabulated in Table IV, wherein amphotericin was used as the mixture for the purpose of the tests.

Amphotericin in mixture or individually, is useful in combatting pathogenic fungi. Specifically, it is effective in the suppression of the ascendency of yeast in fecal flora. Amphotericin can be administered to humans orally in tablets containing ½ to 1 gm. of the antibiotic; and it may be thus used in conjunction with broad-spectrum antibacterial antibiotics such as oxytetracycline, chlorotetracycline or tetracycline, in place of nystatin to overcome the resultant fungal ascendancy.

nystatin is made by comparing their effectiveness against *Candida albicans* in mice. A mixture of amphotericin A and amphotericin B is dissolved in pure dimethyl acetamide to a final ratio of 1 part of amphotericin to 10 parts of dimethyl acetamide. The solution is then diluted with distilled water. For the test, male mice weighing 19–23 grams are infected with *Candida albicans* by the intravenous route, each mouse receiving $2 \times 10^6$ cells as determined by readings in a colorimeter. These mice are then treated, either subcutaneously (s.c.) or per os (p.o.) twice daily for two days with the drug indicated in Table V below. The mice are observed for 10 days

TABLE IV

| Antibiotic | $LD_{50}$ in eggs (administered by yolk sac), (mg./egg) | $LD_{50}$ in mice (administered intraperitoneally in a dimethyl acetamide sol.), (mg./kg.) | $LD_2$ in mice (administered orally in 0.025% agar suspension), (mg./kg.) | $LD_{50}$ in mice (administered subcutaneously), (mg./kg.) |
|---|---|---|---|---|
| Base (Crystalline) | | | >10,000 | >4,800 (16% suspension in agar). |
| Base (Lyophilized) | >8.0 | 28.9 | >10,000 | |
| Na salt | >8.0 | >200.0 | >10,000 | >2,400 (8% aqueous solution). |
| HCl salt | >8.0 | 33.9 | >6,000 | |

COMPARISON OF AMPHOTERICIN WITH OTHER ANTIBIOTICS

Since amphotericin, both as the mixture and individually, displays certain characteristics similar to those of other antibiotics, comparative physical and biological tests have been conducted to establish that they are new antibiotics, not previously produced or disclosed.

Amphotericin possesses a high order of activity as compared to nystatin and Rimocidin. A comparison of a purified mixture of amphotericins A and B with a purified batch of nystatin against two test organisms, is as follows:

Test organism: Ratio of activity, amphotericin/nystatin
*Saccharomyces cerevisiae* ___________________ 2.86
*Candida albicans* ___________________ 5.62

Since Rimocidin has an antifungal spectrum similar to that of nystatin and amphotericin, it was tested, in the form of its sulfate, along with amphotericin and nystatin against *S. cerevisiae*. It is less active than nystatin or amphotericin on a weight basis, as shown by the following table:

MIC against *S. cerevisiae* u./ml.
Nystatin ___________________ 0.512 (8 assays)
Rimocidin sulfate ___________________ 0.915 (9 assays)
Amphotericins ___________________ 0.160 (10 assays)

These results show the superior properties of amphotericin in comparison with nystatin and Rimocidin, against *Saccharomyces cerevisiae* and *Candida albicans*.

Further comparison between the amphotericin and (240 hours), and any animals surviving 240 hours are assigned a value of >240 hours for the purposes of calculation of average survival time. The results are tabulated in Table V.

TABLE V

| Antibiotic | Daily Treatment (mg./mouse/day) | Route | Average Survival Time (hours) | Difference in Survival Time (hours) | Survived/Total (after 10 days) |
|---|---|---|---|---|---|
| Control, 0.5 ml. saline | | s.c. | 48 | | 0/9 |
| Nystatin | 2.0 | s.c. | >237 | >188 | 9/10 |
| | 0.5 | s.c. | >144 | >95 | 3/10 |
| Amphotericin | 2.0 | s.c. | >240 | >191 | 10/10 |
| | 0.5 | s.c. | >240 | >191 | 10/10 |
| Control, 0.5 ml. saline | | p.o. | 49 | | 0/9 |
| Nystatin | 2.0 | p.o. | >86 | >37 | 2/10 |
| | 0.5 | | 62 | +13 | 0/10 |
| Amphotericin | 2.0 | p.o. | >240 | >191 | 10/10 |
| | 0.5 | p.o. | >240 | >191 | 10/10 |

Aside from the above biological differences, amphotericin differs physically from nystatin, Rimocidin and Ascosin as shown by the following specific optical rotation and ultraviolet spectrum adsorption comparisons:

SPECIFIC ROTATION DATA ON AMPHOTERICIN A, AMPHOTERICIN B, NYSTATIN, RIMOCIDIN, AND ASCOSIN
$[\alpha]_D^{24°\,C}$

| Antibiotic | Solvent | | | 0.1 N HCl in methanol |
|---|---|---|---|---|
| | Pyridine | Acetic acid | Dimethyl formamide | |
| | Degrees | Degrees | Degrees | Degrees |
| Amphotericin A | +163 | +93 | +136 | +28 |
| Amphotericin B | | | +238 | −52.2 |
| Nystatin | +11 | −7 | +6.5 | −3.5 |
| Rimocidin, $SO_4$ | +102 | +67 | | |
| Ascosin (50% w./w. $NaHCO_3$) | | | +12.2 | −13 |

The data in this table is considered in conjunction with the known ultraviolet absorption data for the two amphotericins, it is evident that amphotericin A, although it has an ultraviolet spectrum which is similar to that reported for nystatin and Rimocidin, is differentiated therefrom by the respective specific rotations; and similarly, although amphotericin B has an ultraviolet spectrum which is very similar to that of Ascosin, the two are distinguished by the differences in their respective specific rotations.

The conclusion from these comparisons, therefore, is that the amphotericin differs from nystatin, Rimocidin, or Ascosin both in biological effects and physical characteristics.

The invention may be variously otherwise embodied within the scope of the appended claims.

We claim:

1. A process for producing amphotericin, which comprises cultivating a strain of *Streptomyces nodosus* in an aqueous nutrient medium comprising an assimilable, fermentable carbohydrate and an assimilable organic nitrogen source, under submerged aerobic conditions, until substantial anti-fungal activity is imparted to said medium and recovering amphotericin from the medium.

2. A substance effective in inhibiting the growth of fungi, selected from the group consisting of, amphotericin B and the salts thereof, said amphotericin B being an amphoteric substance having the following elementary analysis: C=56.70%, H=7.72%, N=1.87%, O=33.71%; that possesses a crystalline structure in the pure state; has a specific optical rotation, as measured by the D line of sodium at 24° C. of +238° in dimethyl formamide and −52.2° in 0.1 N HCl in methanol; is soluble in glacial acetic acid; has an ultraviolet absorption spectrum measured in methanolic HCl with bands at the following wave lengths: 345, 362, 382 and 405 millimicrons and respective extinction coefficients of 390, 830, 1380 and 1540; an infrared absorption spectrum when suspended in hydrocarbon oil in solid form as shown in Figure 2; and a neutral equivalent when titrated as a base of about 760.

3. Amphotericin B, as described in claim 2.

4. An alkali metal salt of amphotericin B, as described in claim 2.

5. A sodium salt of amphotericin B as described in claim 2.

6. A hydrochloride salt of amphotericin B as described in claim 2.

7. A sulphate of amphotericin B as described in claim 2.

References Cited in the file of this patent

Abst. of Paper No. 14, 15, 113, 114 and 115 presented at Antibio. Symposium, 1956 (5 pp.).

Blank: A.M.A. Arch. of Dermatology, vol. 75, February 1957, pp. 184–195.

Taber et al.: Antibiotics and Chemother., April 1954, pp. 455–461.

Hosoya: The H. of Antibiotics, Ser. A., April 1955, pp. 48–50.

Drug Trade News, November 7, 1955, pp. 51 and 84.

Oroshnik, Science, February 4, 1955, pp. 147–155.

Schatz et al.: Mycologia, vol. 40, No. 4, 1948, pp. 461, 462, 473, 475–477.

Waksman: "The Actinomycetes," pub. 1950, by Chronica Botanica Co., Waltham, Mass., pp. 116–117.

Dutcher et al.: Art. in Antibiotics Annual, 1953–54, pp. 191–194, by Med. Encycl., Inc., N.Y.C.

Waksman: "The Actinomycetes and Their Antibiotics," pp. 174, 176, 177, 182, 183 and 184. Pub. 1953 by Williams and Wilkins Co., Balt., Md.

Smith et al.: Antibiotics and Chemother. pp. 962–970, September 1954.

Alexopoulos: Ohio J. of Science, vol. 41, 1941, pp. 425–430.

Alexopoulos et al.: Bull. of the Torrey Botanical Club, April 1942, vol. 69, No. 4, pp. 257–261.

UNITED STATES PATENT OFFICE

CERTIFICATE OF CORRECTION

Patent No. 2,908,611 October 13, 1959

James D. Dutcher et al.

It is hereby certified that error appears in the printed specification of the above numbered patent requiring correction and that the said Letters Patent should read as corrected below.

Column 3, line 73, after "base" insert -- such as sodium hydroxide or potassium hydroxide. The --; column 4, line 4, strike out "such as sodium hydroxide or potassium hydroxide. The"; column 6, line 72, for "cycelium" read -- mycelium --; column 7, line 7, for "albicarns", in italics, read -- albicans -- in italics.

Signed and sealed this 12th day of April 1960.

(SEAL)
Attest:

KARL H. AXLINE
Attesting Officer

ROBERT C. WATSON
Commissioner of Patents